United States Patent
Jullie et al.

(10) Patent No.: US 9,358,410 B2
(45) Date of Patent: Jun. 7, 2016

(54) LIQUID DRAINAGE INSTALLATION FOR A ROTORCRAFT ENGINE COMPARTMENT

(71) Applicant: AIRBUS HELICOPTERS, Marignane (FR)

(72) Inventors: Thibault Jullie, Aix en Provence (FR); Franck Morente, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/594,532

(22) Filed: Jan. 12, 2015

(65) Prior Publication Data

US 2015/0197346 A1    Jul. 16, 2015

(30) Foreign Application Priority Data

Jan. 13, 2014   (FR) ...................................... 14 00061

(51) Int. Cl.
| | |
|---|---|
| B64D 45/00 | (2006.01) |
| A62C 4/00 | (2006.01) |
| A62C 3/08 | (2006.01) |
| B64C 1/14 | (2006.01) |
| B64D 29/00 | (2006.01) |

(52) U.S. Cl.
CPC ... *A62C 4/00* (2013.01); *A62C 3/08* (2013.01); *B64C 1/1453* (2013.01); *B64D 29/00* (2013.01); *B64D 2045/009* (2013.01)

(58) Field of Classification Search
CPC .......... A62C 4/00; A62C 3/08; B64C 1/1453; B64D 2045/009
USPC ..................................................... 244/129.2
See application file for complete search history.

(56) References Cited

U.S. PATENT DOCUMENTS

| | | | | |
|---|---|---|---|---|
| 2,156,509 | A | * | 5/1939 | Muller ..................... A62C 4/00 220/88.2 |
| 3,371,482 | A | | 3/1968 | Camboulives et al. |
| 5,552,576 | A | * | 9/1996 | Giamati ................ B64C 1/1453 219/201 |
| 2002/0088901 | A1 | * | 7/2002 | Moreland .............. B64D 11/02 244/136 |
| 2006/0249628 | A1 | | 11/2006 | Turner et al. |
| 2006/0273224 | A1 | * | 12/2006 | Hoffjann ................... F16L 5/08 244/136 |

FOREIGN PATENT DOCUMENTS

| | | |
|---|---|---|
| EP | 2620361 | 7/2013 |
| WO | 9946167 | 9/1999 |

OTHER PUBLICATIONS

French Search Report for FR 1400061, Completed by the French Patent Office on Sep. 10, 2014, 6 Pages.

* cited by examiner

*Primary Examiner* — Christopher P Ellis
*Assistant Examiner* — Richard G Davis
(74) *Attorney, Agent, or Firm* — Brooks Kushman P.C.

(57) ABSTRACT

An installation for draining liquid away from an aircraft engine compartment. Said drainage installation comprises a collector for collecting said liquid and provided with an opening putting the collector into fluid flow communication with an upstream inlet of a drainage line that is open to the outside via a downstream outlet. The drainage line includes an obstacle to the flow of the liquid that allows the liquid to flow towards the downstream outlet of the drainage line when there is a predefined quantity of liquid retained by said obstacle. The opening of the collector is provided with a firebreak grille arranged as a cap extending in elevation over the opening and including a plurality of orifices distributed at the periphery of the firebreak grille going from its base towards its top.

11 Claims, 1 Drawing Sheet

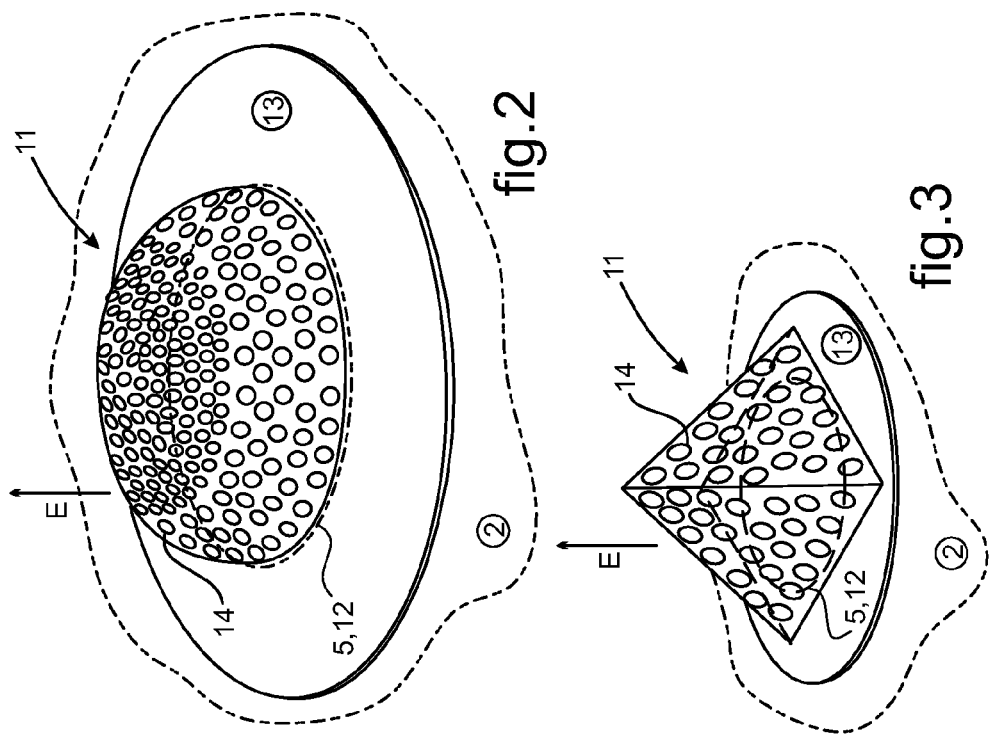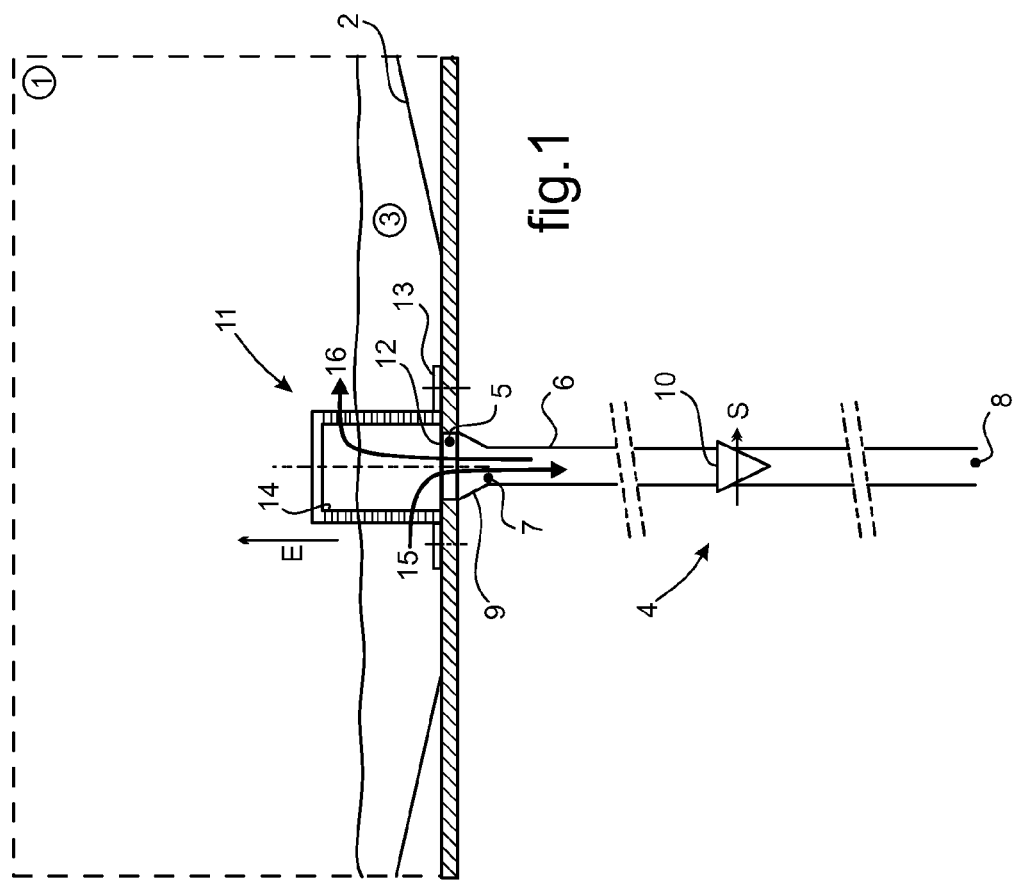

LIQUID DRAINAGE INSTALLATION FOR A ROTORCRAFT ENGINE COMPARTMENT

CROSS REFERENCE TO RELATED APPLICATION

This application claims priority to French patent application No. FR 14 00061 filed on Jan. 13, 2014, the disclosure of which is incorporated in its entirety by reference herein.

BACKGROUND OF THE INVENTION (1) Field of the Invention

The present invention relates to the field of fluid drainage installations that are fitted to motor-driven aircraft, in particular rotorcraft, in order to evacuate the liquid that is contained in a compartment housing an engine of the aircraft.

(2) Description of Related Art

Engined aircraft, such as airplanes or rotorcraft, for example, have a power plant including one or more fuel-burning engines to provide the aircraft at least with propulsion. The engine(s) is/are installed on board the aircraft in compartments that are reserved for engines, which engines may for example be of a combustion engine type or of a turboshaft engine type, and make use of a liquid fuel.

There arises the problem of making the aircraft safe relative to flammable liquid(s) stagnating inside one or each compartments respectively housing an engine, commonly referred to as "engine compartments". Flammable liquid(s) stagnating in one or more engine compartments is a potential source of danger because of the high temperatures that exist in the environment close to the power plant. Such flammable liquids are constituted in particular by fuel and/or lubricant that has accidentally escaped from the power plant, or indeed by a residue of liquid used during maintenance of the power plant, for example.

That is why aircraft are fitted with an installation for draining the liquid that might potentially stagnate inside one or more engine compartments in order to collect said liquid and discharge it to the outside of the aircraft. The liquid that needs to be drained comprises not only flammable liquid(s), but also water that may potentially have infiltrated into the engine compartment(s), and potentially in large quantities.

Such drainage installations comprise a drainage line in fluid flow communication with a liquid collector provided in the bottom of a given engine compartment. The liquid that might stagnate in the engine compartment is drained via the collector, which collector includes at least one opening placed in communication with an upstream inlet of the drainage line. The liquid evacuated from the collector through the opening is conveyed via the drainage line in order to be discharged to the outside of the aircraft via a downstream outlet of the drainage line.

In this context, there arises the problem of organizing the drainage installation while taking various constraints into account.

One constraint relating to the organization of the drainage installation lies in the potential low pressure state inside the engine compartment relative to the surrounding pressure outside the rotorcraft. An engine compartment in a low pressure state may be due in particular both to air flowing inside the drainage line and also to openings in the engine compartment leading to the outside of the aircraft.

The low pressure state of the engine compartment also increases with increasing altitude and/or forward speed of the aircraft, or indeed, in the specific circumstance of a rotorcraft, depending on the orientation of the blast of air produced by a main rotor having a substantially vertical axis that is installed above and close to the power plant in order to provide the rotorcraft at least with lift.

Still in the circumstance of a rotorcraft, the drainage line is typically installed going from the top of the rotorcraft towards its bottom, thereby leading to a pressure difference between the upstream inlet and the downstream outlet of the drainage line. For some other type of aircraft, having a longitudinal extent between the front and the rear that is considerable, such as for an airplane, the drainage line may extend so as to run along a low slope.

It is found that said low pressure state in the engine compartment constitutes an impediment against evacuating the liquid through the drainage line. Consequently, it is known to provide an obstacle in the drainage line between the collector and a downstream zone of the drainage line, which obstacle serves to retain the liquid drained by the collector. The liquid retained upstream from the obstacle is spontaneously discharged to the downstream zone of the drainage line as soon as the pressure of the column of retained liquid is sufficient to overcome the pressure difference between the collector and the downstream outlet of the drainage line.

By way of example, such an obstacle may be formed by a valve that can be caused to open at a given pressure threshold, such as described for example in Document EP 1 062 155 (Allied Signal Inc.), or also by way of example it may be formed by a constriction arranged in the drainage line, as described by Document EP 2 620 361 (Airbus Operations SL). Reference may also be made to Document U.S. Pat. No. 3,371,482 A.A.M.L. Camboulives et al.) and US 2006/249628 (Jeffrey Turner et al.), each of which describing a cell for an airplane turboprop, which cell has a drainage duct. According to U.S. Pat. No. 3,371,482, the drainage duct is fitted with a valve that is urged towards an open position and that closes in the event of excess pressure. According to US 2006/249628, the drainage duct is provided at its trailing edge with a deflector for guiding fluids away from the cell.

Another constraint relating to the organization of the drainage installation lies in making it safe relative to potential propagation of flames from the collector towards the drainage line in the event of a fire in the engine compartment(s). For this purpose, one or more ducts forming the drainage line are conventionally made using a fireproof material. It has been found that a drawback of such provisions lies in increasing the weight, the bulk, and/or the cost of obtaining the drainage line.

In this context, and given the continuing search in the field of aviation seeking to make rotorcraft safe against the propagation of a fire, if any, it is appropriate to improve the conditions for preserving the drainage installation by preventing flames from passing from the collector towards the drainage line.

In various fields, it is known to use firebreak grilles as obstacles to the passage of flames through an opening in the event of a fire. Such firebreak grilles are used conventionally in the field of construction, for example.

Nevertheless, the constraints due to said low pressure state of the engine compartment make it awkward to adapt such firebreak grilles to the field of aviation. It is, however, useful to seek a solution that enables the opening of the collector to be provided with such a firebreak grille.

Indeed, fitting the opening with a grille presents other advantages, such as that of retaining any solid bodies that might be present inside the collector so as to prevent them from passing into the drainage line. It is appropriate to avoid the drainage line becoming clogged by such solid bodies, not only to avoid constituting an obstacle to the flow of the liquid along the drainage line, but also they might potentially be flammable.

Nevertheless, although such firebreak grilles can present the advantage of retaining said solid bodies, they are conversely also likely to constitute an obstacle to passing not only the liquid through the opening of the collector, but also to passing air rising towards the collector on being expelled by the liquid flowing through the drainage line.

That is why it is common practice in the field of aircraft to keep clear the opening of the collector in order to enhance the freedom of the fluid drained by the collector to flow therethrough while avoiding excessively increasing the cross-section of the ducts forming the drainage line.

In the context of another constraint relating to organizing the drainage line, any such increase in the cross-section of the duct(s) is undesirable.

More particularly, the drainage line extends along or is incorporated in the walls of the aircraft. Consequently, it is desirable for the drainage line to be of size and weight that are as small as possible in order to make it easier to incorporate on board the aircraft.

BRIEF SUMMARY OF THE INVENTION

The object of the present invention is to provide an installation for draining liquid out from an engine compartment of an aircraft, and in particular a rotorcraft.

On the basis of the analysis made above and that stem from the concepts on which the present invention is based, such an installation is more particularly sought that provides a satisfactory compromise in particular concerning the various above-mentioned problems and constraints.

The drainage installation of the present invention comprises a collector for collecting the liquid that stagnates inside a said engine compartment. The collector is provided with at least one opening providing fluid flow communication between the collector and an upstream inlet of a drainage line that is open to the outside via a downstream outlet.

The drainage line of the present invention also includes an obstacle to the flow of the liquid, which obstacle is arranged between the upstream inlet and the downstream outlet of the drainage line.

Said obstacle is suitable for allowing the liquid to flow towards the downstream outlet of the drainage line, depending on there being a predefined quantity of liquid retained by said obstacle, said retained liquid naturally coming from the collector for discharging to the outside of the drainage line via its downstream outlet.

The drainage installation of the present invention is recognizable mainly in that said at least one opening of the collector is provided with a firebreak grille arranged as a cap extending in elevation over the opening and including a plurality of orifices distributed at the periphery of the firebreak grille going from its base towards its top.

The cap is a member that is conventionally formed by a wall providing an enclosure including an outlet to the outside. The outlet from the cap is of course placed around the opening of the collector, the cap defining a volume over the opening that is in communication with the inside volume of the collector via said orifices.

The base of the firebreak grille should of course be understood as being situated in a low zone close to the opening of the collector, as contrasted to the top of the firebreak grille, which is situated in a high zone remote from said base in the direction extending in elevation of the firebreak grille.

In the event of the collector draining liquid, said liquid flows towards the drainage line via the orifices arranged in the low zone of the firebreak grille, while air coming from the drainage line and entrained towards the collector under the effect of the flow of liquid from the collector to the drainage line escapes via the orifices formed in the high zone of the firebreak grille.

It can be seen that in spite of the collector draining a potentially large volume of liquid and in spite of the presence of air in the drainage line that might oppose a satisfactory flow of the liquid coming from the collector, the discharge of said liquid via the firebreak grille towards the opening is enhanced by facilitating the ejection of air from the drainage line towards the collector via the orifices formed in the high zone of the firebreak grille.

In addition, the arrangement of the firebreak grille in the form of a cap that extends in elevation makes it possible to increase the area of the grille and to increase the number of orifices and thus to increase the total perforated area of the firebreak grille. It is thus possible to obtain comfortable discharge of the liquid in spite of the opening being partially obstructed by the firebreak grille, and this continues to apply even in the event of the firebreak grille retaining possible litter coming from the collector.

The individual areas and/or the shapes of said orifices, which are potentially provided in considerable number, may be adapted to impart its firebreaking nature to the grille for preventing any flames from passing from the collector towards the drainage line.

Since the drainage line is protected from a source of fire coming from the engine compartment(s), the ducts that make it up do not need to have special arrangements seeking to protect them from flames, thereby obtaining advantages of limiting their weight, their size, and the costs of obtaining them.

It is preferable to dimension the firebreak grille so that regardless of the quantity of liquid drained by the collector, the liquid is discharged from the collector before the firebreak grille becomes immersed in the liquid that has drained into the collector.

In accordance with the provisions of the invention, liquid is discharged to the drainage line even in the event of the firebreak grille being immersed.

Since the pressure exerted by the liquid in the low zone of the firebreak grille is higher than the pressure exerted by the liquid in the high zone of the firebreak grille, the liquid tends to flow easily through the firebreak grille without constituting an obstacle to discharging air. Such ease of flow is obtained even in the event of the orifices being individually small in size so as to give the firebreak grille its ability to oppose the passage of flames through the grille.

Another constraint that needs to be taken into consideration when the individual orifices are small in size, lies in the surface tension of the liquid tending to oppose passage of the liquid through orifices of small area, particularly if the orifices are circular in shape. The pressure exerted in the low zone of the firebreak grille by the column of liquid drained by the collector is found to be sufficient to avoid any difficulty in the liquid passing through orifices that are individually small in area.

The arrangement of the orifices relative to one another and their distribution through the firebreak grille are potentially uniform going from the base towards the top of the firebreak grille. The arrangement of the orifices should of course be understood relative to their individual dimensions and their shapes.

Nevertheless, it has been found potentially useful to vary the arrangement of the orifices relative to one another and/or their distribution through the firebreak grille on going from the base of the firebreak grille towards its top.

More particularly, the arrangement of the orifices relative to one another and their distribution through the firebreak grille may potentially vary going from the base of the firebreak grille towards its top between a low zone and a high zone of the firebreak grille.

Said low zone of the firebreak grille is identified as being for evacuating the liquid drained by the collector towards the drainage line. Said high zone of the firebreak grille is identified as being for allowing air coming from the drainage line to escape towards the collector.

Furthermore, and in a preferred embodiment, the openings of the orifices are shaped and dimensioned for a flame obstacle distance lying in the range 0.5 millimeters (mm) to 3 mm.

These provisions are such that the orifices themselves confer its firebreaking nature on the grille such that there is no need for any other special provision of the kind conventionally used in the construction industry, where intumescent material is used.

It should be recalled that in the field of combating fire, a flame obstacle distance is defined as being a maximum dimension for a passage that makes it possible to ensure that a flame is stopped. Such a flame obstacle distance is understood as able to stop the flames through the orifices.

After testing, it has been found that an appropriate choice consists in giving the openings of the orifices a shape that is circular with an individual area lying in the range 2 square millimeters ($mm^2$) to 6 $mm^2$.

In addition, such an obstacle distance used for dimensioning the orifices does not constitute an obstacle to obtaining a satisfactory flow rate of the liquid through the firebreak grille.

The orifices may be arranged in considerable number through a large area made available by the wall forming the firebreak grille that extends in elevation, thereby obtaining a total orifice area that is considerable so as to make it easy for liquid to flow through the firebreak grille.

In an embodiment, the shape of the firebreak grille is adapted to encourage as large a number of orifices as possible to be oriented through the thickness of the grille in a direction that extends transversely to the direction in which the firebreak grille extends in elevation.

More particularly, the orifices are preferably arranged for the most part or totally through the lateral faces of the firebreak grille while being oriented transversely to the direction in which the firebreak grille extends in elevation.

The dimension in elevation of the firebreak grille is preferably greater than a depth of liquid that is tolerated inside the collector. Said tolerated liquid depth is identified in particular depending on the flow rate allowed for liquid through the firebreak grille, at least through its low zone, and depending on the volume of the drainage line as considered between its downstream outlet and said obstacle.

The opening of the collector is preferably in fluid flow communication with the drainage line via a connection arranged as a funnel. These provisions are such that the dimensions of the opening of the collector, and consequently the dimensions of the firebreak grille can be optimized without that involving an increase in the section of the duct of the drainage line connected to the collector via the opening that is provided with the funnel.

In a preferred embodiment, said obstacle is formed by a valve that can be controlled to open at a predetermined pressure threshold of the liquid coming from the collector and acting on the valve.

In a preferred configuration of the firebreak grille, at least the lateral faces of the firebreak grille are defined by a surface of revolution giving the firebreak grille a preferred shape as a dome, or as a cone, or as a cylinder.

Such provisions make it possible to optimize the area of the firebreak grille, preferably in its low zone, so as to optimize the rate at which the liquid is discharged from the collector towards the drainage line.

In another possible configuration of the firebreak grille, the cross-section of the firebreak grille is polygonal in shape. Under such circumstances, the lateral faces of the firebreak grille may potentially slope relative to the direction in which the firebreak grille extends in elevation, thereby giving it a pyramid shape.

BRIEF DESCRIPTION OF THE SEVERAL VIEWS OF THE DRAWINGS

Embodiments of the present invention are described below with reference to the figures of the accompanying sheet, in which:

FIG. 1 is a diagrammatic view of a drainage installation in an embodiment of the invention; and FIGS. 2 and 3 are perspective views of respective shapes for a firebreak grille included in the drainage installation shown in FIG. 1.

DETAILED DESCRIPTION OF THE INVENTION

In FIG. 1, a drainage installation is for fitting to a rotorcraft in order to discharge 15 liquid 3 from an engine compartment 1 of the rotorcraft.

The drainage installation comprises a collector 2 arranged in the bottom of the engine compartment 1 to drain the liquid 3 and direct it towards a drainage line 4 in order to reject it to the outside of the rotorcraft.

In its bottom, the collector 2 has a plurality of openings such as the opening 5 that is shown, through which the liquid 3 is discharged from the collector 2 towards a duct 6 fitted to a given opening 5 and providing an upstream inlet 7 of the drainage line 4.

The liquid 3 is suitable for flowing along the drainage line 4 in order to be discharged to the outside of the rotorcraft via a downstream outlet 8 of the drainage line 4.

Naturally, the concepts of "upstream" and "downstream" are considered relative to the flow direction of the liquid 3 along the drainage installation going from the collector 2 to the downstream outlet 8 of the drainage line 4.

Said opening 5 is connected to the upstream inlet 7 of the drainage line 4 via a funnel 9 serving to reduce dimensions between the opening 5, which it is desired to have as large as possible, and the upstream inlet 7 of the drainage line 4, which it is desired to have as compact as possible.

The extent of the drainage line 4 along the rotorcraft between the upstream inlet 7 and the downstream outlet 8 may be considerable, depending on the vertical size of the rotorcraft when on the ground. A significant pressure difference is typically observed between the collector 2 and the downstream outlet 8 from the drainage line 4.

In order to avoid a low pressure inside the collector 2 impeding the flow of liquid 3 through the drainage installation, an obstacle 10 to the passage of the liquid 3 is provided in the drainage line 4 between the upstream inlet 7 and the downstream outlet 8.

In the embodiment shown, such an obstacle 10 is in the form of a valve that can be caused to open at a predetermined pressure threshold S depending on the column of liquid 3 retained upstream from the obstacle 10.

The opening 5 is provided with a firebreak grille 11 housed inside the collector 2 to prevent flames from passing into the collector 2 in the event of a fire in the drainage line 4.

Such a firebreak grille 11 also presents the advantage of retaining any solid bodies in order to prevent them passing through the opening 5 towards the drainage line 4.

In FIGS. 1 to 3, the firebreak grille 11 is arranged as a cap suitable for covering the opening 5 of the collector 2, extending in elevation E over the bottom of the collector 2. Such a cap has a wall defining an enclosure that closes the volume defined by the firebreak grille 11, providing at its base an outlet 12 of the firebreak grille 11 that is to be placed facing the opening 5 of the collector 2.

In the embodiments shown, the firebreak grille 11 is also provided with an assembly member 13 for assembling it to the bottom wall of the collector 2. Such an assembly member 13 may be arranged as a plate for fastening the firebreak grille so as to enable it to be installed at the bottom of the collector 2. Orifices 14 are provided at least through the side faces of the firebreak grille 11, being distributed around the periphery of the firebreak grille 11 from its base going up to its top. Such orifices 14 place the inside volume of the firebreak grille 11 in fluid flow communication with the inside volume of the collector 2.

As shown in FIG. 1, orifices 14 in a first set provided in a low zone of the firebreak grille 11 are dedicated to discharging 15 the liquid 3 out from the collector 2. Orifices 14 in a second set are provided in the high zone of the firebreak grille 11 and they are dedicated to allowing air coming from the drainage line 4 to escape 16 into the collector 2.

The terms "low" and "high" describing the zones of the firebreak grille 11 are relative concepts that are considered in the direction extending in elevation E of the firebreak grille 11, the low zone being towards the base of the firebreak grille 11 and the high zone being towards the top of the firebreak grille 11.

Naturally, in operation of the drainage installation, the above-mentioned purposes for the orifices 14 do not determine the nature of the fluid that might flow through the various sets of orifices 14, in particular in the extreme situation of the firebreak grille 11 being completely immersed. Nevertheless, and in accordance with a major advantage of the present invention, the liquid 3 drained by the collector 2 is suitable for passing through the firebreak grille 11 via the orifices 14 of the first set, while air coming from the drainage line 4 is suitable for escaping towards the collector 2 via the orifices 14 of the second set.

In FIG. 1, the firebreak grille 11 is arranged as a cylinder. In FIG. 2, the firebreak grille 11 is arranged as a dome. In FIG. 3, the firebreak grille 11 is arranged as a pyramid having its base defined by a four-sided polygon. Such cylinder, dome, or pyramid general shapes for the firebreak grille 11 are shown as non-restrictive embodiments given the potential variety of shapes for the firebreak grille 11.

As shown in FIGS. 1 and 3, the individual arrangement of the orifices 14 relative to their shape and/or their dimensions, and also the distribution of the orifices 14 at the periphery of the firebreak grille 11 may well be uniform.

In FIG. 2, the individual arrangement of the orifices 14 relative to their size, and indeed potentially relative to their shapes, and also the distribution of the orifices 14 at the periphery of the firebreak grille 11 vary between the low zone and the high zone of the firebreak grille 11.

In FIGS. 1 to 3, the orifices 14 are circular in shape and most if not all of them are arranged through the outer wall of the firebreak grille 11 transversely relative to the direction extending in elevation E of the firebreak grille 11.

The individual area of the orifices 14 advantageously lies in the range 2 mm$^2$ to 6 mm$^2$, such that the orifices 14 are suitable on their own and without other specific arrangements for opposing possible flames coming from the collector passing through them, for preventing them passing into the drainage line 4 in the event of a fire in the engine compartment. These provisions make it possible to confer its firebreaking nature on the grille 11 solely on the basis of the dimensions and/or the shapes of the orifices 14.

What is claimed is:

1. A drainage installation for draining liquid away from an aircraft engine compartment, said drainage installation comprising a collector for collecting said liquid, which collector has at least one opening enabling the collector to be put into fluid flow communication with an upstream inlet of a drainage line that is open to the outside via a downstream outlet, the drainage line including an obstacle to the flow of the liquid, which obstacle is arranged between the upstream inlet and the downstream outlet of the drainage line, said obstacle being suitable for allowing the liquid to flow towards the downstream outlet of the drainage line depending on a predefined quantity of liquid retained by said obstacle, wherein said at least one opening of the collector is provided with a firebreak grille arranged as a cap extending in elevation over the opening and including a plurality of orifices distributed at the periphery of the firebreak grille going from its base towards its top.

2. A drainage installation according to claim 1, wherein the arrangement of the orifices relative to one another and their distribution through the firebreak grille are uniform going from the base towards the top of the firebreak grille.

3. A drainage installation according to claim 1, wherein the arrangement of the orifices relative to one another and their distribution through the firebreak grille vary going from the base towards the top of the firebreak grille between a low zone of the firebreak grille for discharging to the drainage line the liquid that has been drained by the collector, and a high zone of the firebreak grille for allowing the escape towards the collector of air coming from the drainage line.

4. A drainage installation according to claim 1, wherein the openings of the orifices are shaped and dimensioned for a flame obstacle distance lying in the range 0.5 mm to 3 mm, the orifices themselves conferring its firebreaking nature on the grille.

5. A drainage installation according to claim 1, wherein the openings of the orifices are circular in shape and have individual areas lying in the range 2 mm$^2$ to 6 mm$^2$.

6. A drainage installation according to claim 1, wherein the orifices are arranged for the most part through the side faces of the firebreak grille being oriented transversely to its direction extending in elevation.

7. A drainage installation according to claim 1, wherein the dimension in elevation of the firebreak grille is greater than a depth of liquid that is tolerated inside the collector.

8. A drainage installation according to claim 1, wherein the firebreak grille is in fluid flow communication with the drainage line via a connection arranged as a funnel.

9. A drainage installation according to claim 1, wherein said obstacle is formed by a valve that can be controlled to open at a predetermined pressure threshold of the liquid coming from the collector and acting on the valve.

10. A drainage installation according to claim 1, wherein at least the lateral faces of the firebreak grille are defined by a surface of revolution.

11. A drainage installation according to claim 1, wherein the cross-section of the firebreak grille is polygonal in shape.

* * * * *